United States Patent
Chowdhury et al.

(10) Patent No.: US 9,666,207 B2
(45) Date of Patent: May 30, 2017

(54) VEHICLE AUDIO TRANSMISSION CONTROL

(71) Applicant: GM GLOBAL TECHNOLOGY OPERATIONS LLC, Detroit, MI (US)

(72) Inventors: Md Foezur Rahman Chowdhury, Troy, MI (US); Gaurav Talwar, Novi, MI (US); Xu Fang Zhao, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/878,737

(22) Filed: Oct. 8, 2015

(65) Prior Publication Data

US 2017/0103773 A1   Apr. 13, 2017

(51) Int. Cl.
*G10L 21/0364*   (2013.01)
*G06F 3/16*   (2006.01)
*G10L 21/01*   (2013.01)

(52) U.S. Cl.
CPC .......... *G10L 21/0364* (2013.01); *G06F 3/162* (2013.01); *G10L 21/01* (2013.01)

(58) Field of Classification Search
None
See application file for complete search history.

(56) References Cited

U.S. PATENT DOCUMENTS

| 6,980,663 B1* | 12/2005 | Linhard | G10L 21/0208 381/77 |
| 8,275,145 B2* | 9/2012 | Buck | H04R 27/00 381/119 |
| 8,824,697 B2* | 9/2014 | Christoph | H04R 3/005 381/122 |
| 2005/0259831 A1* | 11/2005 | Hutt | H04R 1/345 381/86 |
| 2010/0041443 A1* | 2/2010 | Yokota | H04M 1/6083 455/569.2 |
| 2016/0029111 A1* | 1/2016 | Wacquant | H04R 3/005 381/71.4 |

* cited by examiner

*Primary Examiner* — Paul Huber
(74) *Attorney, Agent, or Firm* — Lorenz & Kopf, LLP (57) ABSTRACT

Methods and systems for controlling audio communications between occupants of a vehicle are provided. In accordance with one embodiment, a system includes an interface and a processor. The interface is configured to at least facilitate receiving a request for sound transmission from a first occupant inside a vehicle to a second occupant inside the vehicle. The processor is coupled to the interface, and is configured to at least facilitate identifying respective locations of the first occupant and the second occupant, and performing the sound transmission with an adjustment for a phase difference based at least in part on the respective locations of the first occupant and the second occupant.

15 Claims, 5 Drawing Sheets

VEHICLE AUDIO TRANSMISSION CONTROL

TECHNICAL FIELD

The present disclosure generally relates to vehicles, and more particularly relates to methods and systems for audio transmission within vehicles.

BACKGROUND

Certain vehicles today include systems by which one vehicle occupant can more easily communicate audibly with a second vehicle occupant. However, it may be desired to further customize such systems to further enhance audio communications between occupants of the vehicle.

Accordingly, it is desirable to provide techniques for facilitating audio transmissions between occupants of a vehicle. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises receiving a request for sound transmission from a first occupant inside a vehicle to a second occupant inside the vehicle, identifying respective locations of the first occupant and the second occupant, and performing the sound transmission with an adjustment for a phase difference based at least in part on the respective locations of the first occupant and the second occupant.

In accordance with another exemplary embodiment, a system is provided. The system comprises an interface and a processor. The interface is configured to at least facilitate receiving a request for sound transmission from a first occupant inside a vehicle to a second occupant inside the vehicle. The processor is coupled to the interface, and is configured to at least facilitate identifying respective locations of the first occupant and the second occupant, and performing the sound transmission with an adjustment for a phase difference based at least in part on the respective locations of the first occupant and the second occupant.

In accordance with a further exemplary embodiment, a vehicle is provided. The vehicle comprises a passenger cabin, an interface, and a processor. The passenger cabin comprises a plurality of locations therein. The interface is configured to at least facilitate receiving a request for sound transmission from a first location of the plurality of locations in the passenger cabin to a second location of the plurality of locations in the passenger cabin. The processor coupled to the interface, and is configured to at least facilitate determining a distance between the first location and the second location, and performing the sound transmission with an adjustment for a phase difference based at least in part on the distance.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
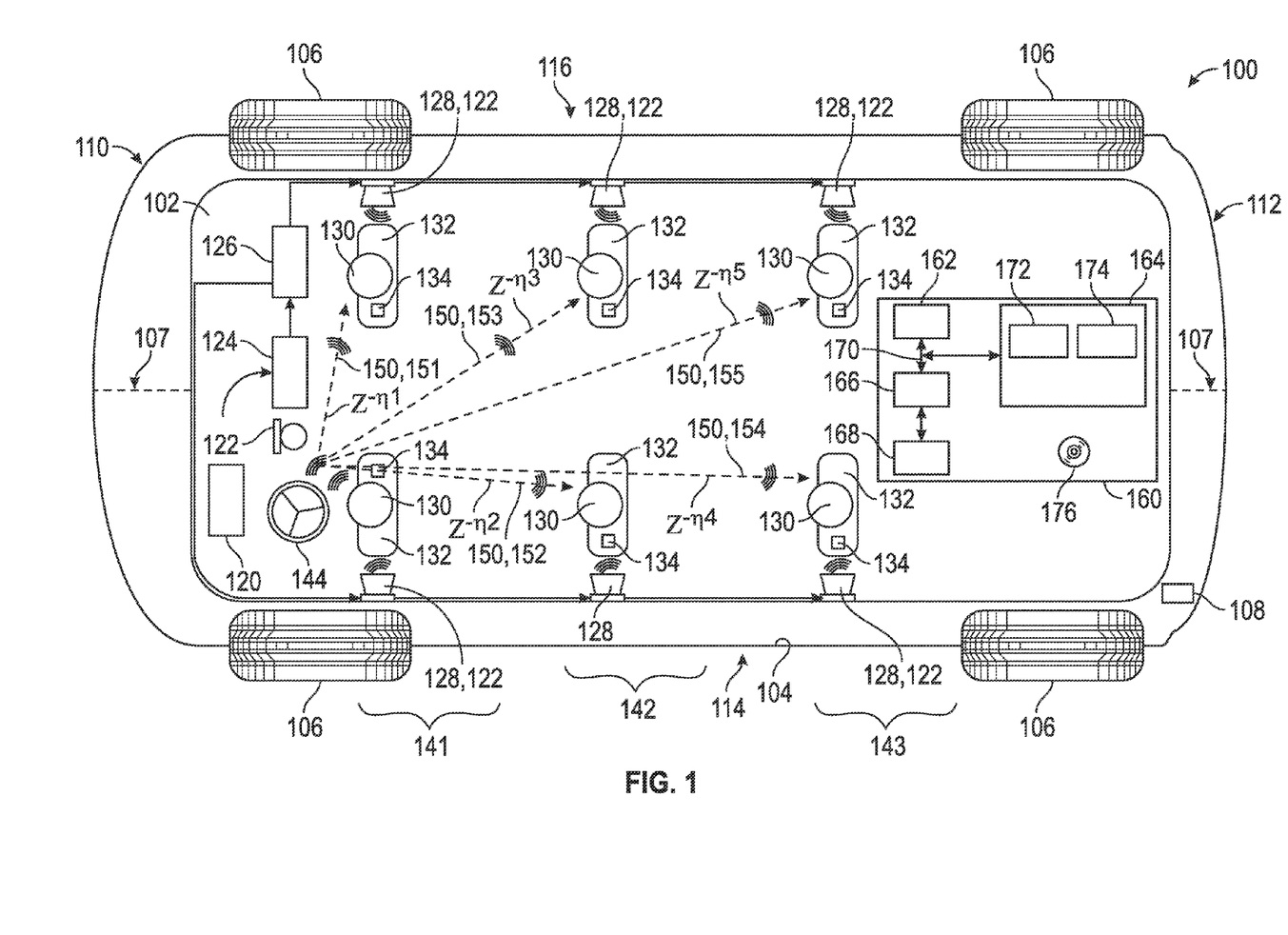
FIG. 1 is a functional block diagram of a vehicle that includes a control system for controlling audio transmission between occupants of the vehicle, in accordance with an exemplary embodiment.

FIG. 1 illustrates a vehicle 100, or automobile, according to an exemplary embodiment. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

As described in greater detail further below, the vehicle 100 includes a control system 102 for controlling audio transmission between occupants of the vehicle 100. In various embodiments, the control system 102 adjusts for a phase difference between transmitted sound (e.g. amplified sound transmitted through speakers) and a reflected sound (e.g. sound that is not amplified and that is not transmitted through speakers) to provide for a more pleasing audio transmission for the occupants of the vehicle 100.

As depicted in FIG. 1, the vehicle 100 includes, in addition to the above-referenced control system 102, a body 104, four wheels 106, and a propulsion system 108. In one embodiment, the body 104 is arranged on a chassis 107, and substantially encloses the other components of the vehicle 100. In one embodiment, the body 104 and the chassis 107 may jointly form a frame. The wheels 106 are each rotationally coupled to the chassis 107 near a respective corner of the body 104. Also as depicted in FIG. 1, the vehicle 100 includes a front side (or portion) 110, a rear side (or portion) 112, a driver side (or portion) 114, and a passenger side (or portion) 116. In various embodiments the vehicle 100 may differ from that depicted in FIG. 1. For example, in certain embodiments the number of wheels 106 may vary.

In various embodiments, the propulsion system 108 is mounted on the chassis 107 that drives the wheels 106. In one embodiment, the propulsion system 108 includes an engine, such as a combustion engine. In other embodiments, the propulsion system 108 may include one or more other types of engines and/or motors, such as an electric motor/generator, instead of or in addition to the combustion engine. Also in certain embodiments, the propulsion system 108 may include and/or be coupled to one or more drive shafts to drive the wheels 106.

In one embodiment, the control system 102 is mounted on the chassis 107. As discussed above, the control system 102 controls audio transmission between occupants of the vehicle 100. Also as discussed above, in various embodiments, the control system 102 adjusts for a phase difference between transmitted sound and a reflected sound to provide for a more pleasing audio transmission for the occupants of the vehicle 100.

As depicted in FIG. 1, in one embodiment the control system 102 comprises a user interface 120, microphones 122, a radio system 124, an amplifier 126, speakers 128, and a controller 160 Also in the depicted embodiment, the control system 102 is used to facilitate audio communications between multiple occupants 130 of the vehicle 100. As depicted in FIG. 1, each of the occupants 130 sits in one of the seats 132 of the vehicle 100. In the depicted embodiment, there are three rows of seats 132; namely, a first row 141, a second row 142, and a third row 143. However, the number of rows and/or seats may vary in different embodiments.

Also in one embodiment depicted in FIG. 1, the control system 102 includes one or more sensors 134 disposed in each of the seats 132 of the vehicle 100. In one embodiment, the sensors 134 determine which seat 132 is occupied by passengers that are participating in the audio communication that is controlled by the control system 102. In addition, in one embodiment, the sensors 134 determine specific portions of each seat 132 in which the occupant 130 is sitting (e.g. as to whether the occupant 130 is sitting on a front edge of the seat 132, a rear edge of the seat 132, a driver's side edge of the seat 132, a passenger's side edge of the seat 132, toward a middle portion of the seat 132, and/or whether the occupant 130 is sitting upright, leaning in a particular direction, or lying down in the seat 132, and so on).

The user interface 120 is configured to receive inputs from one or more occupants of the vehicle 100 with respect to audio communications within the vehicle 100. In one embodiment, the user interface comprises one or more input devices that are configured to receive inputs from one occupant of the vehicle 100 to speak with one or more other occupants of the vehicle 100 using a radio system 124 of the vehicle 100. In one embodiment, the user interface 120 is disposed proximate to a driver side seat 132 of the first row 141 of the vehicle 100, proximate a steering wheel 144 of the vehicle 100, for use by a driver of the vehicle 100. In certain embodiments, the user interface 120 (and/or multipole user interfaces) are also disposed proximate other seats 132 of the vehicle 100, for use by other occupants 130 of the vehicle 100. In certain embodiments, the user interface 120 may comprise one or more interactive display screens, touch screens, buttons, knobs, levers, and/or other user interface component, for example by which the driver (and/or other occupants 130 of the vehicle 100) can select with which other occupants 130 they wish to audible communicate.

The microphones 122 are each coupled to one or more user interface 120. The microphones are used to receive and transmit sounds from the occupants as selected via the user interface 120. In one embodiment, a microphone 122 is disposed proximate to a driver side seat 132 of the first row 141 of the vehicle 100, proximate a steering wheel 144 of the vehicle 100, for use by a driver of the vehicle 100. In certain embodiments, other microphones 122 are disposed proximate each of the other seats 132 of the vehicle 100, for use by each of the other occupants 130 of the vehicle 100.

The speakers 128 broadcast selected sounds for the occupants 130 of the vehicle 100. Specifically, in one embodiment, the speakers 128 broadcast audio communications between multiple occupants 130 of the vehicle 100 based on requests received via the user interface 120. In one embodiment, a speaker 128 is disposed proximate to a driver side seat 132 of the first row 141 of the vehicle 100, proximate a steering wheel 144 of the vehicle 100, for use by a driver of the vehicle 100. In certain embodiments, other microphones 122 are disposed proximate each of the other seats 132 of the vehicle 100, for use by each of the other occupants 130 of the vehicle 100.

The radio system 124 is used to process and transmit the sounds captured by the microphones 122 in accordance with the instructions received by the user interface 120. In one embodiment, for the occupant 130 that is selected to be speaking as part of the audio communications at a particular time, the sound is captured by the corresponding microphone 122 closest to the selected occupant 130, and is processed via the radio system and transmitted to the amplifier 126. The amplifier 126 amplifies the received sounds for transmission via one or more speakers, preferably included the speaker 128 that is closest to the occupant 130 that has been selected to receive the audio communications (via requests received by the user interface 120).

The controller 160 is coupled to various other components of the control system 102. For example, in certain embodiments, the controller 160 is coupled to each of the user interfaces 120, microphones 122, radio system 124, amplifier 126, speakers 128, and sensors 134, and controls operation thereof.

The controller 160 controls audio communications between the occupants 130 of the vehicle 100 using the control system 102. In certain embodiments, the controller 160 controls audio communications between the occupants 130 of the vehicle 100 by adjusting for a latency between (A) transmitted sounds between the occupants 130 via the speakers 128 and (B) reflected sounds that travel between the occupants 130 directly within the interior cabin of the vehicle 100 (i.e. the reflected sounds are not processed through the radio system 124, are not amplified via the amplifier 126, and are not transmitted via the speakers 128). In various embodiments, the controller 160, along with the other components of the control system 102, provide these and other functions in accordance with the steps discussed further below in connection with the schematic drawings of the vehicle 100 in FIG. 1 and the flowcharts and schematic drawings pertaining to the process 200 discussed further below in connection with FIGS. 2-5.

In certain embodiments, as discussed further below in connection with the process 200, the processor 162 determines the latency for adjustment based at least in part on distances 150 between the occupants 130. For example, with reference to the example of FIG. 1, the distances may include the following (among other possible distances between other occupants 130): (i) a first distance 151 between a first occupant 130 in the driver side of the first row 141 and a second occupant 130 in the passenger side of the first row 141; (ii) a second distance 152 between the first occupant 130 in the driver side of the first row 141 and a third occupant 130 in the driver side of the second row 142; (iii) a third distance 153 between the first occupant 130 in the driver side of the first row 141 and a fourth occupant 130 in the passenger side of the second row 142; (iv) a fourth distance 154 between the first occupant 130 in the driver side of the first row 141 and a fifth occupant 130 in the driver side of the third row 143; and (v) a fifth distance 155 between the first occupant 130 in the driver side of the first row 141 and a sixth occupant 130 in the passenger side of the third row 143.

As depicted in FIG. 1, the controller 160 comprises a computer system. In certain embodiments, the controller 160 may also include the user interface 120, one or more sensors and/or other devices, and/or systems, and/or components thereof. In addition, it will be appreciated that the controller 160 may otherwise differ from the embodiment depicted in FIG. 1. For example, the controller 160 may be coupled to or may otherwise utilize one or more remote computer systems and/or other control systems, and/or one or more other systems of the vehicle 100.

In the depicted embodiment, the computer system of the controller 160 includes a processor 162, a memory 164, an interface 166, a storage device 168, and a bus 170. The processor 162 performs the computation and control functions of the controller 160, and may comprise any type of processor or multiple processors, single integrated circuits such as a microprocessor, or any suitable number of integrated circuit devices and/or circuit boards working in cooperation to accomplish the functions of a processing unit. During operation, the processor 162 executes one or more programs 172 contained within the memory 164 and, as such, controls the general operation of the controller 160 and the computer system of the controller 160, generally in executing the processes described herein, such as the process 200 described further below in connection with FIGS. 2-5.

The memory 164 can be any type of suitable memory. For example, the memory 164 may include various types of dynamic random access memory (DRAM) such as SDRAM, the various types of static RAM (SRAM), and the various types of non-volatile memory (PROM, EPROM, and flash). In certain examples, the memory 164 is located on and/or co-located on the same computer chip as the processor 162. In the depicted embodiment, the memory 164 stores the above-referenced program 172 along with one or more stored values 174.

The bus 170 serves to transmit programs, data, status and other information or signals between the various components of the computer system of the controller 160. The interface 166 allows communication to the computer system of the controller 160, for example from a system driver and/or another computer system, and can be implemented using any suitable method and apparatus. In one embodiment, the interface 166 obtains information from the user interface 120, is coupled to the user interface 120, and/or is part of the user interface 120. In various embodiments, the interface 166 can include one or more network interfaces to communicate with other systems or components. The interface 166 may also include one or more network interfaces to communicate with technicians, and/or one or more storage interfaces to connect to storage apparatuses, such as the storage device 168.

The storage device 168 can be any suitable type of storage apparatus, including direct access storage devices such as hard disk drives, flash systems, floppy disk drives and optical disk drives. In one exemplary embodiment, the storage device 168 comprises a program product from which memory 164 can receive a program 172 that executes one or more embodiments of one or more processes of the present disclosure, such as the steps of the process 200 (and any sub-processes thereof) described further below in connection with FIGS. 2-5. In another exemplary embodiment, the program product may be directly stored in and/or otherwise accessed by the memory 164 and/or a disk (e.g., disk 176), such as that referenced below.

The bus 170 can be any suitable physical or logical means of connecting computer systems and components. This includes, but is not limited to, direct hard-wired connections, fiber optics, infrared and wireless bus technologies. During operation, the program 172 is stored in the memory 164 and executed by the processor 162.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 162) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 160 may also otherwise differ from the embodiment depicted in FIG. 1, for example in that the computer system of the controller 160 may be coupled to or may otherwise utilize one or more remote computer systems and/or other control systems.

While the components of the control system 102 are depicted as being part of the same system, it will be appreciated that in certain embodiments these features may comprise two or more systems. In addition, in various embodiments the control system 102 may comprise all or part of, and/or may be coupled to, various other vehicle devices and systems, such as, among others, the propulsion system 108, and/or one or more other systems of the vehicle 100.

Figure 2:
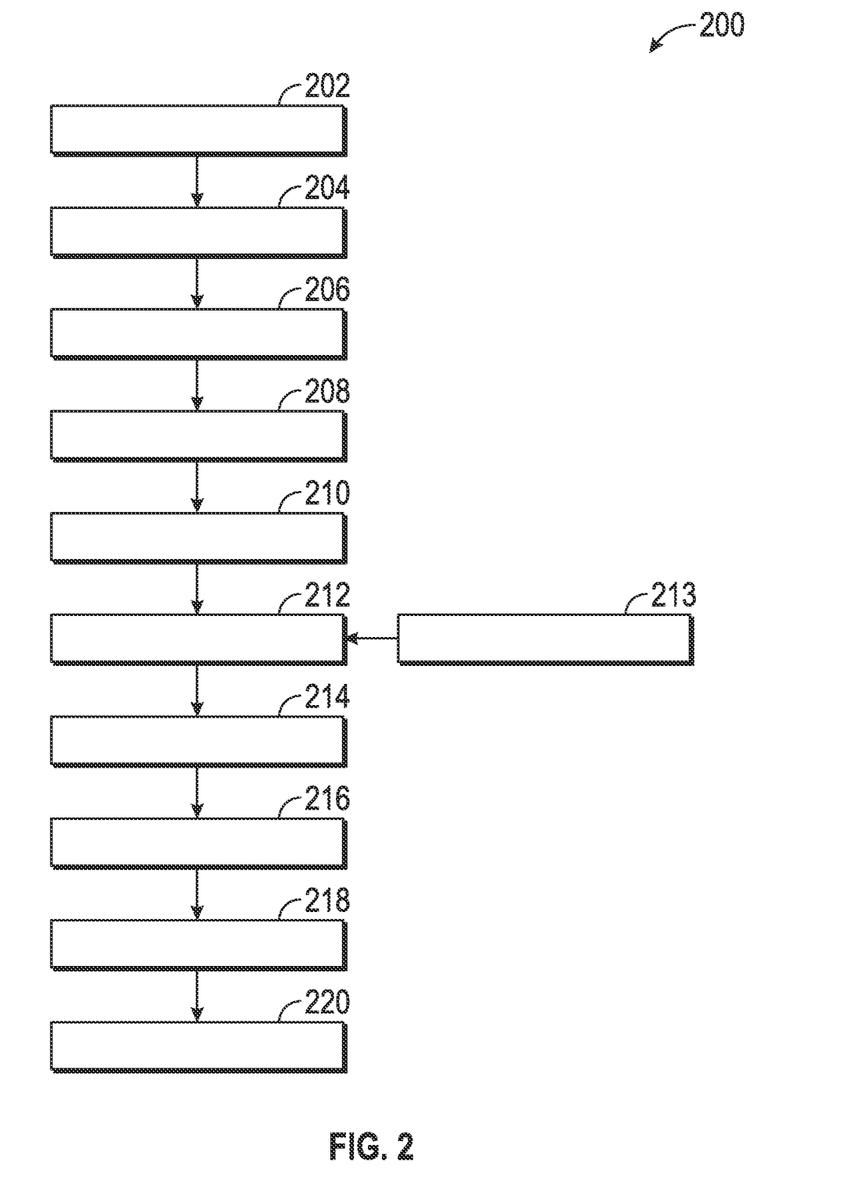
FIG. 2 is a flowchart of a processor for controlling audio transmission between occupants of a vehicle, and the can be implemented in connection with the vehicle of FIG. 1, in accordance with an exemplary embodiment.

FIG. 2 is a flowchart of a process 200 for controlling audio communications within a vehicle, in accordance with an exemplary embodiment. The process 200 can be implemented in connection with the vehicle 100 of FIG. 1, in accordance with an exemplary embodiment.

As depicted in FIG. 2, a request is received at step 202. In one embodiment, the request is made by an occupant 130 of the vehicle 100 to engage in audio communications with one or more other occupants 130 of the vehicle 100. In one embodiment, the request is received via an user interface 120 (e.g. via one or more interactive display screens, touch screens, buttons, knobs, levers, and/or other user interface components) from a driver of the vehicle 100, and/or from one or more other occupants 130 of the vehicle 100. Also in one embodiment, the request includes an identification of which other occupants 130 the requesting occupant 130 wishes to communicate with.

Sounds are obtained (step 204). In one embodiment, sounds are first obtained from the occupant 130 of the vehicle 100 that has made the communication request in step 202. Also in one embodiment, the sounds are obtained in step 204 via one or more microphones 122 of the control system 102 of FIG. 1.

As referenced herein, the occupant 130 making the sounds (e.g. spoken words) is referred to as the "originator", and the occupant 130 receiving the sounds (e.g. spoken words) is referred to as the "recipient". Also in one embodiment, the originator generally makes the request of step 202; however, this may vary in other embodiments. It will be appreciated that in various embodiments there may be multiple originators and/or multiple recipients. It will also be appreciated that in certain embodiments the originator may subsequently become the recipient, and vice versa. For example, in one embodiment, the originator may press a button or some other user interface 120 component when it is the originator's turn to speak, and subsequently (e.g. in response to the originator's communications) the recipient may then press his or her button or some other user interface 120 component and then begin speaking in return (in which case the original recipient may then be viewed as the new originator, and the original originator may be viewed as the new recipient, and so on). It will similarly be appreciated that the process 200 may proceed through various iterations as different requests are made in different iterations of step 202 and different sounds are obtained in different iterations of step 204 (and other steps of the process 200 may similarly repeat in various corresponding iterations, and so on).

A first location is determined with respect to the originator of the audio communications (step 206). In one embodiment, the first location comprises a seat 132 of the vehicle 100 of FIG. 1 in which the originator is sitting. In one embodiment, this determination is made with respect to which user interface 120 has been engaged (e.g. by determining which seat 132 of the vehicle 100 is closest to the user interface 120 that has been engaged in the request for audio communications).

In addition, in one embodiment, the first location is determined with even greater specificity in step 206 based also on which part of the seat 132 the originator is sitting in. Specifically, in one embodiment, each seat 132 comprises a plurality of regions (e.g. an upper region versus a lower region; a region closest to the front 110 of the vehicle 100 versus a region closest to the rear 112 of the vehicle 100; a region closest to the driver's side 114 of the vehicle 100 versus a region closest to the passenger side 116 of the vehicle 100, and so on), and measurements from one or more sensors 134 of the applicable seat 132 are used with respect to a region of the plurality of regions in which the originator is currently sitting. Accordingly, in certain embodiments, the determination of step 206 may include, for example, whether the originator is sitting on a front edge of the seat 132, a rear edge of the seat 132, a driver's side edge of the seat 132, a passenger's side edge of the seat 132, toward a middle portion of the seat 132, and/or whether the originator is sitting upright, leaning in a particular direction, or lying down in the seat 132, and so on.

A second location is determined with respect to the recipient of the audio communications (step 208). In one embodiment, the second location comprises a seat 132 of the vehicle 100 of FIG. 1 in which the recipient is sitting. In one embodiment, this determination is made with respect to the input that was provided to the user interface 120 as a designation with respect to a destination for the originator's message and/or one or more other designations with respect to an occupant 130 of the vehicle 100 with whom the originator wishes to communicate. For example, in one embodiment, the originator engages a specific button, touch screen designation, and/or other designation as part of the request of step 202 as to the other occupant(s) of the vehicle 100 with whom the originator wishes to communicate as part of the request.

In addition, in one embodiment, the second location is determined with even greater specificity in step 208 based also on which part of the seat 132 the recipient is sitting in. Specifically, similar to the discussion above in step 206, in certain embodiments one or more sensors 134 may be similarly used to with respect to a region of the plurality of regions in which the recipient is currently sitting. Accordingly, in certain embodiments, the determination of step 208 may similarly include, for example, whether the recipient is sitting on a front edge of the seat 132, a rear edge of the seat 132, a driver's side edge of the seat 132, a passenger's side edge of the seat 132, toward a middle portion of the seat 132, and/or whether the recipient is sitting upright, leaning in a particular direction, or lying down in the seat 132, and so on.

One or more distances are determined (step 210). In one embodiment, a distance is determined between the originator of the audio communications and the recipient of the audio communications, for example as defined above. In one embodiment, a distance is determined between a first region of the vehicle in which the originator is disposed and a second region of the vehicle of the vehicle in which the recipient is disposed. In one embodiment the distance is determined between respective seats 132 in which the originator and recipient are sitting. Also in one embodiment, the distance also takes into account the particular regions the originator and the recipient are sitting. In various embodiments, a distance between the originator and the recipient is determined by the processor 162 of FIG. 1 by comparing the locations of the originator and recipient from steps 206 and 208 with known distances between the respective locations (e.g. as determined by the vehicle manufacture and stored in the memory 164 of FIG. 1 as stored values 174).

In addition, in certain embodiments, the distances determined in step 210 also include additional distances between the originator and/or the recipient and one or more components of the control system 102. For example, in one embodiment, a distance between the recipient and a speaker 128 of FIG. 1 in closest proximity to the recipient is also determined in step 210. By way of further example, in one embodiment, a distance between the originator and a microphone 122 used by the originator is also determined in step 210.

Data is retrieved from memory (step 212). In one embodiment, the processor 162 of FIG. 1 retrieves stored values 174 from the memory 164 of FIG. 1 that provide, in view of the distance(s) of step 210, latency values between (A) transmitted sounds between the originator and the recipient via the respective microphone 122 and speaker 128 pursuant to the request of step 202, and (B) reflected sounds that travel between the originator and the recipient directly within the interior cabin of the vehicle 100 (i.e. the reflected sounds are not processed through the radio system 124, are not amplified via the amplifier 126, and are not transmitted via the speakers 128).

As depicted in FIG. 2, in one embodiment, the data of step 212 is previously generated during prior testing (step 213). The prior testing of step 213 is performed prior to the current vehicle drive or ignition cycle of steps 202-212 (and of steps 214-220, discussed further below). In one embodiment, the prior testing of step 213 is performed on one or more test vehicles that are different than, but that are of the same or similar type as the vehicle 100 of FIG. 1, for example during development of the vehicle type by the vehicle manufacturer.

Figure 3:
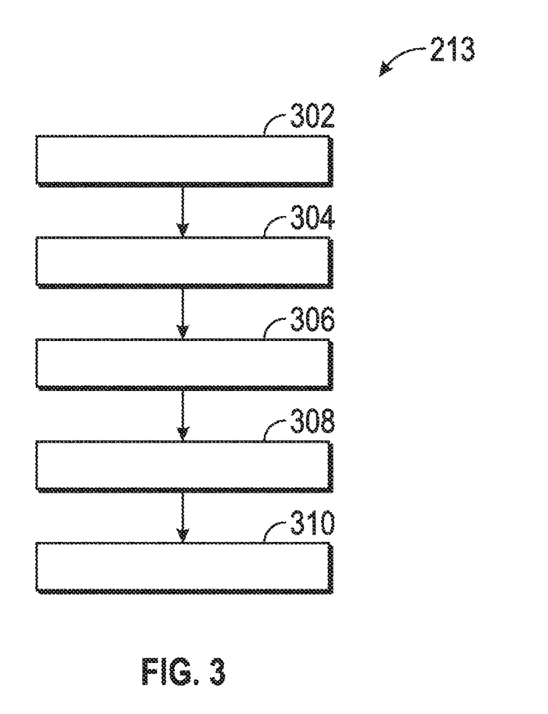
FIG. 3 is a flowchart of a sub-process of the process of FIG. 2, namely a sub-process for generating data via prior testing, in accordance with an exemplary embodiment.

With reference to FIG. 3, a sub-process for step 213 is provided (with various steps or sub-steps 302-310) in accordance with one exemplary embodiment. As depicted in FIG. 3, test trials are conducted. Specifically, in one embodiment during testing of the test vehicles, various sound levels are entered into various microphones of the test vehicles, amplified, and transmitted to various speakers of the test vehicles. The sounds are monitored (step 304), and latencies are determined between (A) the amplified sounds transmitted from the originator to the recipient via the speakers versus (B) the natural reflection of the sounds from the originator and the recipient within the interior cabin of the test vehicle without transmission through the speakers (step 306). For example, in one embodiment, the latency comprises a difference in time that the recipient receives (A) the transmitted sounds versus (B) the reflected sounds. Also in one embodiment, the latency comprises a difference in waveform between (A) the transmitted sounds versus (B) the reflected sounds. As these steps are repeated for different vehicle position combinations for the originator and the recipient, the latencies for each combination are used to generate a data construct (e.g. a look-table and/or formula) (step 308), and the data construct is stored in memory (e.g. the memory of each vehicle before it is sold to the public) (step 310).

Returning to FIG. 3, a latency is determined (step 214). In one embodiment, an expected latency is determined by the processor 162 of FIG. 1, based on the data retrieved in step 212, between (A) transmitted sounds, i.e. amplified sounds that are to be transmitted from the originator to the recipient via a speaker 128 versus (B) reflected sounds, i.e. sounds that are naturally reflected as they travel from the originator to the recipient within the interior of the vehicle cabin without using a speaker. In one embodiment, the expected latency comprises an expected difference in time that the recipient is expected to receive (A) the transmitted sounds versus (B) the reflected sounds, based on the distances of step 210 in combination with the look-up table, formula, or other data construct of steps 212-213.

In addition, in one embodiment, a phase difference is determined (step 216). In one embodiment, a phase difference is determined by the processor 162 of FIG. 1, based on the data retrieved in step 212, between (A) transmitted sounds, i.e. amplified sounds that are to be transmitted from the originator to the recipient via a speaker 128 versus (B) reflected sounds, i.e. sounds that are naturally reflected as they travel from the originator to the recipient within the interior of the vehicle cabin without using a speaker. In one embodiment, the phase difference comprises an expected difference in the phases of the audio sound that the recipient is expected to receive (A) the transmitted sounds versus (B) the reflected sounds, based on the distances of step 210 in combination with the look-up table, formula, or other data construct of steps 212-213. Also in one embodiment, the phase difference is determined by the processor 162 of FIG. 1 in step 216 based on the latency of step 214 (e.g. as the phase difference that is to be expected for the latency of step 214, based on the data of steps 212-213 from the prior vehicle testing).

In certain embodiments, parametric estimation is utilized to determine the latency and/or phase difference in steps 214 and/or 216. There are a multitude of methods to estimate the time delay due to the reflected signal. One such method is to use cross correlation techniques. Also in certain embodiments, a Z-transformation, which is used for digital filters, can also be utilized to determine the latency and/or phase difference. For example, in certain embodiments, a Z-transformation that utilizes an adaptive design as a function of geographical distance between the originator and the recipient is utilized by the processor 162 of FIG. 1, and estimated coefficients are used to determine the latency and/or phase difference between the transmitted and reflected sounds discussed above.

An adjustment is made (step 218). Specifically, prior to transmission, the sound of step 204 is adjusted to account for the latency and/or phase difference between the transmitted and reflected sounds discussed above. In one embodiment, a phase of the transmitted sound is adjusted by the processor 162 of FIG. 1 to approximate the expected phase of the reflected sound as it reaches the recipient, to thereby reduce or eliminate the latency between the transmitted and reflected sounds. In one embodiment, the processor 162 performs the adjustment by adjusting an amplitude of the waveform of the transmitted sound to approximate the amplitude of the reflected sound.

As a result of the adjustment of step 218, the transmitted and reflected sounds will appear, to the recipient, consistent with one another, for example as being heard by the recipient at approximately the same time. Accordingly, this can help to remove any "echo" that might have otherwise been experienced by the recipient between the transmitted and reflected sounds. In one embodiment, the phase adjustment can be implemented via a time delay used by the processor 162 with respect to the transmitted sound, so that the transmitted sound and the reflected sound arrive at the recipient, and are heard by the recipient, at approximately the same time (and, preferably, any remaining latency is significantly small such that it would not be readily detected via human ears).

The adjusted sound is transmitted (step 220). Specifically, in one embodiment, the adjusted sound of step 218 is transmitted via one or more of the speakers 228 of FIG. 1 in accordance with the request of step 202, and in accordance with instructions provided via the processor 162 of FIG. 1 in fulfilling the request. In one embodiment, the sound is also amplified via the amplifier 126 prior to transmission via the speakers. To ensure it sounds coherently to the user, the amplification may be done after the phase adjustment in one embodiment.

Figure 4:
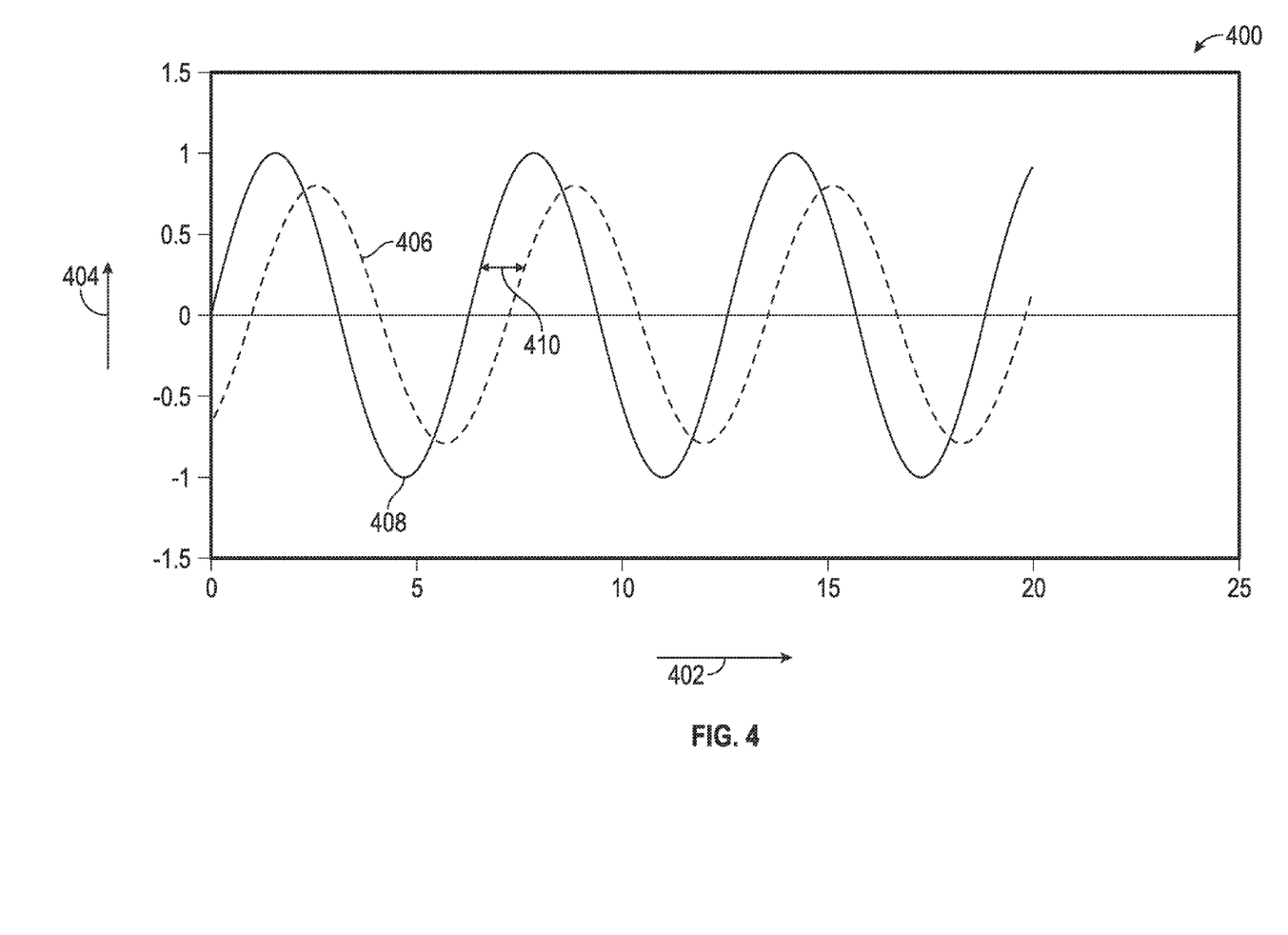
FIG. 4 is a graphical illustration of a phase difference that can be adjusted for using the process of FIGS. 2 and 3 and the control system of FIG. 1, in accordance with an exemplary embodiment.

The resulting communications may be relatively pleasing for the occupants as compared with other techniques, for example by reducing or eliminating the latency or echo effect. For example, with reference to FIG. 4, a graphical illustration 400 is provided showing the reflected sound 406 with the transmitted sound 408, if no adjustment were made to the transmitted sound 408 in step 218 of FIG. 2. The x-axis 402 represents time, and the y-axis 404 represents amplitude. As shown in FIG. 4, if the adjustment of step 218 were not provided, a phase difference 410 would result between the reflected and transmitted sounds 406, 408.

Figure 5:
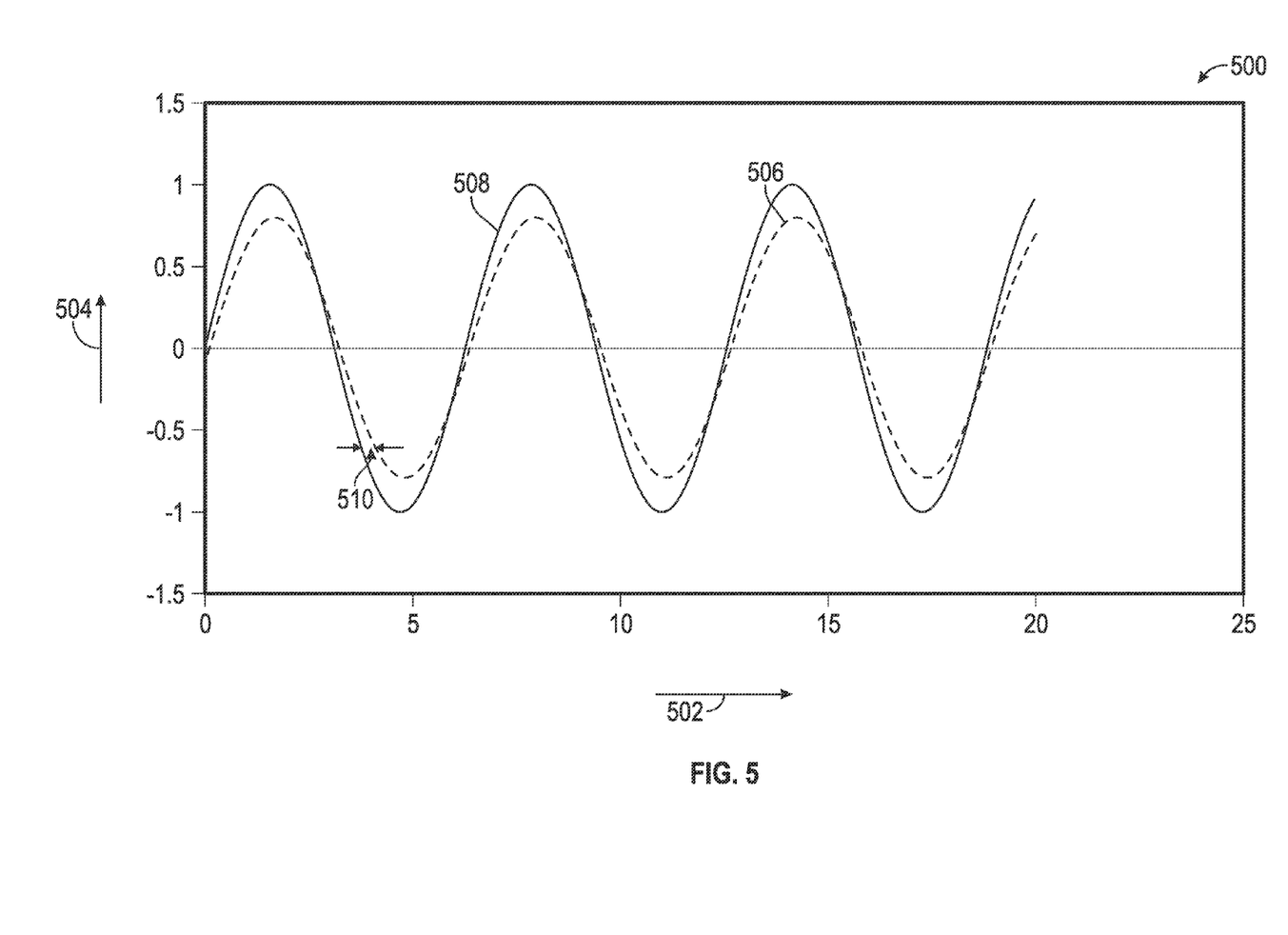
FIG. 5 is a graphical illustration of an adjustment of the phase difference of FIG. 4 using the process of FIGS. 2 and 3 and the control system of FIG. 1, in accordance with an exemplary embodiment.

With reference to FIG. 5, a graphical illustration 500 is provided showing the reflected sound 506 with the transmitted sound 508, after incorporating the adjustment to the transmitted sound 508 in step 218 of FIG. 2. The x-axis 502 represents time, and the y-axis 504 represents amplitude. As shown in FIG. 5, after the adjustment of step 218 is provided, the phase difference 510 between the reflected and transmitted sounds 506, 508 is significantly reduced.

Returning to FIG. 2, it will be appreciated that in various embodiments some or all of the process 200 may be repeated. For example, as discussed above, the process 200 may be repeated when further communications are made, for example, when the original recipient responds to the initial communications, and the original recipient becomes the new originator, and vice versa. The process 200 may similarly be repeated when new communication requests are received, and so on.

Accordingly, methods, systems, and vehicles are provided for facilitating audio communications among occupants of a vehicle. In various embodiments, communications are facilitated between different occupants of the vehicle using an amplifier and speaker that include an adjustment of the phase difference to account for an expected latency that may otherwise exist between the transmitted sound via the speakers and the naturally reflected sound within the interior cabin of the vehicle between the occupants of the vehicle. As a result, the latency, or echo, in the communication is reduced or eliminated, resulting in potentially more pleasing communications between the occupants of the vehicle.

It will be appreciated that the disclosed methods, systems, and vehicles may vary from those depicted in the Figures and described herein. For example, the vehicle 100, the control system 102, and/or various components thereof may vary from that depicted in FIG. 1 and described in connection therewith. In addition, it will be appreciated that certain steps of the process 200 (and/or sub-processes thereof) may vary from those depicted in FIGS. 2-5 and/or described above in connection therewith. It will similarly be appreciated that certain steps of the methods described above may occur simultaneously or in a different order than that depicted in FIGS. 2-5 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method comprising:
   receiving a request for sound transmission from a first occupant inside a vehicle to a second occupant inside the vehicle;
   identifying respective locations of the first occupant and the second occupant;
   adjusting for a phase difference between a transmitted sound from the first occupant and a reflected sound from the first occupant, wherein the adjusting for the phase difference is made based at least in part on the respective locations of the first occupant and the second occupant; and
   performing the sound transmission with the adjustment for the phase difference, wherein the step of performing the sound transmission comprises provided the sound transmission of an amplified sound from the first occupant via an audio speaker that is disposed inside the vehicle proximate to the second occupant, and wherein the adjustment adjusts for a latency between the amplified sound and the reflected sound.

2. The method of claim 1, wherein the adjustment adjusts for a latency between the amplified sound and the reflected sound.

3. The method of claim 2, further comprising:
   determining a distance between the first occupant and the second occupant; and
   determining the latency using the distance.

4. The method of claim 3, wherein the step of determining the latency comprises:
   retrieving data from memory, the data including latency values for different distances based on prior testing; and
   determining the latency using the data.

5. The method of claim 3, further comprising:
   determining a second distance between the second occupant and a speaker through which the sound transmission is performed;
   wherein the step of determining the latency comprises determining the latency using the distance and the second distance.

6. The method of claim 3, further comprising:
   determining a seat in which the second occupant is sitting;
   wherein the step of determining the distance comprises determining the distance based at least in part on the seat in which the second occupant is sitting.

7. The method of claim 6, wherein the seat comprises a plurality of regions, and the method further comprises:
   determining a region of the plurality of regions in which the second occupant is sitting;
   wherein the step of determining the distance comprises determining the distance based at least in part on the region of the seat in which the second occupant is sitting.

8. A system comprising:
   an interface configured to at least facilitate receiving a request for sound transmission from a first occupant inside a vehicle to a second occupant inside the vehicle; and
   a processor coupled to the interface and configured to at least facilitate:
   identifying respective locations of the first occupant and the second occupant;
   adjusting for a phase difference between a transmitted sound from the first occupant and a reflected sound from the first occupant, wherein the adjusting for the phase difference is made based at least in part on the respective locations of the first occupant and the second occupant; and
   performing the sound transmission with the adjustment for the phase difference, wherein the processor is configured to at least facilitate providing the sound transmission of an amplified sound from the first occupant via an audio speaker that is disposed inside the vehicle proximate to the second occupant, and wherein the adjustment reduces the phase difference between the amplified sound and a reflected sound from the first occupant, the reflected sound travelling from the first occupant to the second occupant without the audio speaker.

9. The system of claim 8, wherein the adjustment adjusts for a latency between the amplified sound and the reflected sound.

10. The system of claim 9, wherein the processor is further configured to at least facilitate:
    determining a distance between the first occupant and the second occupant; and
    determining the latency using the distance.

11. The system of claim 10, further comprising:
    a memory configured to store data that includes latency values for different distances based on prior testing;
    wherein the processor is configured to at least facilitate:
    retrieving the data from the memory; and
    determining the latency using the data.

12. The system of claim 10, wherein the processor is configured to at least facilitate:
    determining a second distance between the second occupant and a speaker through which the sound transmission is performed; and
    determining the latency using the distance and the second distance.

13. The system of claim 10, wherein the processor is further configured to at least facilitate:
   determining a seat in which the second occupant is sitting; and
   determining the distance based at least in part on the seat in which the second occupant is sitting.

14. The system of claim 13, wherein the seat comprises a plurality of regions, and the system further comprises:
   a sensor configured to obtain a measurement as to a region of the plurality of regions in which the second occupant is sitting;
   wherein the processor is configured to at least facilitate determining the distance comprises determining the distance based at least in part on the region of the seat in which the second occupant is sitting.

15. A vehicle comprising:
   a passenger cabin comprising a plurality of locations therein;
   an audio speaker that is disposed inside the vehicle proximate to the second occupant;
   an interface configured to at least facilitate receiving a request for sound transmission from a first location of the plurality of locations in the passenger cabin to a second location of the plurality of locations in the passenger cabin; and
   a processor coupled to the interface and configured to at least facilitate:
      determining a distance between the first location and the second location;
      adjusting for a phase difference between a transmitted sound from the first occupant and a reflected sound from the first occupant, wherein the adjusting for the phase difference is made based at least in part on the distance; and
      performing the sound transmission with the adjustment, wherein the processor is configured to at least facilitate providing the sound transmission of an amplified sound from the first occupant via the audio speaker, and wherein the adjustment reduces the phase difference between the amplified sound and a reflected sound from the first occupant, the reflected sound travelling from the first occupant to the second occupant without the audio speaker.

* * * * *